US012080131B2

(12) United States Patent
Kuriyama et al.

(10) Patent No.: US 12,080,131 B2
(45) Date of Patent: Sep. 3, 2024

(54) INFORMATION PROCESSING APPARATUS, INFORMATION PROCESSING METHOD, AND INFORMATION PROCESSING SYSTEM

(71) Applicant: mixi, Inc., Tokyo (JP)

(72) Inventors: Kosuke Kuriyama, Tokyo (JP); Masanori Matsumoto, Tokyo (JP); Nobutaka Komaki, Tokyo (JP)

(73) Assignee: mixi, Inc., Tokyo (JP)

( * ) Notice: Subject to any disclaimer, the term of this patent is extended or adjusted under 35 U.S.C. 154(b) by 264 days.

(21) Appl. No.: 17/696,861

(22) Filed: Mar. 17, 2022

(65) Prior Publication Data

US 2022/0207964 A1 Jun. 30, 2022

Related U.S. Application Data

(63) Continuation of application No. PCT/JP2021/008048, filed on Mar. 3, 2021.

(30) Foreign Application Priority Data

Mar. 12, 2020 (JP) ................................ 2020-043191

(51) Int. Cl.
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/3211* (2013.01); *G07F 17/323* (2013.01); *G07F 17/3276* (2013.01)

(58) Field of Classification Search
None
See application file for complete search history.

(56) References Cited

U.S. PATENT DOCUMENTS

| | | | | |
|---|---|---|---|---|
| 2013/0316774 | A1 | 11/2013 | Lutnick et al. | |
| 2014/0364181 | A1 | 12/2014 | Emura | |
| 2019/0147703 | A1 | 5/2019 | Malek | |
| 2019/0244485 | A1 | 8/2019 | Jones | |
| 2021/0327221 | A1 | 10/2021 | Matsui et al. | |
| 2022/0207965 | A1* | 6/2022 | Komaki | G07F 17/3223 |
| 2022/0215500 | A1* | 7/2022 | Toyoshima | H04L 67/535 |

(Continued)

FOREIGN PATENT DOCUMENTS

| | | | |
|---|---|---|---|
| GB | 2526862 | A | 12/2015 |
| JP | 2010160612 | A | 7/2010 |
| JP | 2013114487 | A | 6/2013 |

(Continued)

OTHER PUBLICATIONS

International Search Report in PCT Application No. PCT/JP2021/008048 mailed Jun. 1, 2021, 2pp.

*Primary Examiner* — Ronald Laneau
(74) *Attorney, Agent, or Firm* — HAUPTMAN HAM, LLP

(57) ABSTRACT

An information processing apparatus includes a processor configured to execute a process including executing, according to an instruction of a bettor who places a bet on a competition, a bettor's bet for a first competition on the basis of a betting target designated by a tipster for the first competition. If the bettor's bet for the first competition is a win, the executing includes executing a bettor's bet for a second competition that takes place after the first competition, on the basis of a betting target designated by the tipster for the second competition.

14 Claims, 9 Drawing Sheets

(56) References Cited

U.S. PATENT DOCUMENTS

2022/0215501 A1* 7/2022 Ishii ...................... G07F 17/323

FOREIGN PATENT DOCUMENTS

| | | | |
|---|---|---|---|
| WO | 0150363 | A1 | 7/2001 |
| WO | 2014064955 | A1 | 5/2014 |
| WO | 2016201515 | A1 | 12/2016 |
| WO | 2020036210 | A1 | 2/2020 |

* cited by examiner

| BETTOR ID | TIPSTER | REMAINING BUDGET AMOUNT |
|---|---|---|
| 0001 | A | 8,000 |
| | B | 3,000 |
| 0002 | A | 17,000 |
| | C | 6,000 |
| ... | ... | ... |

INFORMATION PROCESSING APPARATUS, INFORMATION PROCESSING METHOD, AND INFORMATION PROCESSING SYSTEM

CROSS-REFERENCE TO RELATED APPLICATIONS

The present application is a continuation application of International Application number PCT/JP2021/008048, filed on Mar. 3, 2021, which claims priority under 35 U.S.C § 119(a) to Japanese Patent Application No. 2020-043191, filed on Mar. 12, 2020. The contents of these applications are incorporated herein by reference in their entirety.

BACKGROUND OF THE INVENTION

Technical Field

The present invention relates to an information processing apparatus, an information processing method, and an information processing system.

A system is known in which a bet (vote) can be placed from a portable device on various competitions, such as a horse race, a motorboat race, or the like. Japanese Unexamined Patent Application Publication No. 2013-114487 discloses a system in which a bettor can purchase a betting ticket using a portable device.

Betting procedures adopted in the above-described competitions are complicated, and placing a bet itself is a big hurdle for those who have little experience in betting (hereinafter referred to as "beginner bettors"). For example, in the case of a horse race, a bicycle race, a motorboat race, or the like, it is difficult for a beginner bettor to figure out how to place a bet because he/she must select a betting type and a contestant from among many betting patterns.

Therefore, it is conceivable that the betting contents of other experienced bettors are presented to the beginner bettor, and the beginner bettor bets with the same contents as the experienced bettors. In this case, it is desirable for the beginner bettor to select a bettor who has a high win rate over a bettor who has a low win rate, but it is a hassle to select, for each competition, a bettor who is considered to have a high win rate. On the other hand, it is conceivable that the beginner bettor may decide upon a reliable bettor in advance, however the win rate of that bettor may be low depending on information he/she has or his/her condition that day. Therefore, it was difficult for the beginner bettor to continuously place bets on the betting contents of another bettor who has the high win rate.

BRIEF SUMMARY OF THE INVENTION

The present disclosure focuses on this point, and its object is to make it easier for a beginner bettor to continuously bet on the betting contents of another person who has a high win rate.

An information processing apparatus according to a first aspect of the present disclosure is an information processing apparatus which accepts a bet for each competition in which a bet can be placed on a betting target, the information processing apparatus includes a processor configured to execute a process including executing, according to an instruction of a first player, a first player's bet for a first competition on the basis of a betting target designated by a second player for the first competition, wherein the executing includes executing a first player's bet for a second competition that takes place after the first competition, on the basis of a betting target designated by the second player for the second competition if the first player's bet for the first competition is a win.

An information processing method according to a second aspect of the present disclosure is an information processing method that is executed by a computer which accepts a bet for each competition in which a bet can be placed on a betting target, including: executing, according to an instruction of a first player, a first player's bet for a first competition on the basis of a betting target designated by a second player for the first competition; and executing a first player's bet for a second competition that takes place after the first competition, on the basis of a betting target designated by the second player for the second competition if the first player's bet for the first competition is a win.

An information processing system according to a third aspect of the present disclosure includes: an information processing apparatus that accepts a bet for each competition in which a bet can be placed on a betting target; and a terminal for placing a bet on the betting target, wherein the information processing apparatus has a processor configured to execute a process including executing, according to an instruction of a first player received from the terminal, a first player's bet for a first competition on the basis of a betting target designated by a second player for the first competition, wherein the executing includes executing a first player's bet for a second competition that takes place after the first competition, on the basis of a betting target designated by the second player for the second competition if the first player's bet for the first competition is a win.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<System Configuration>

Figure 1:
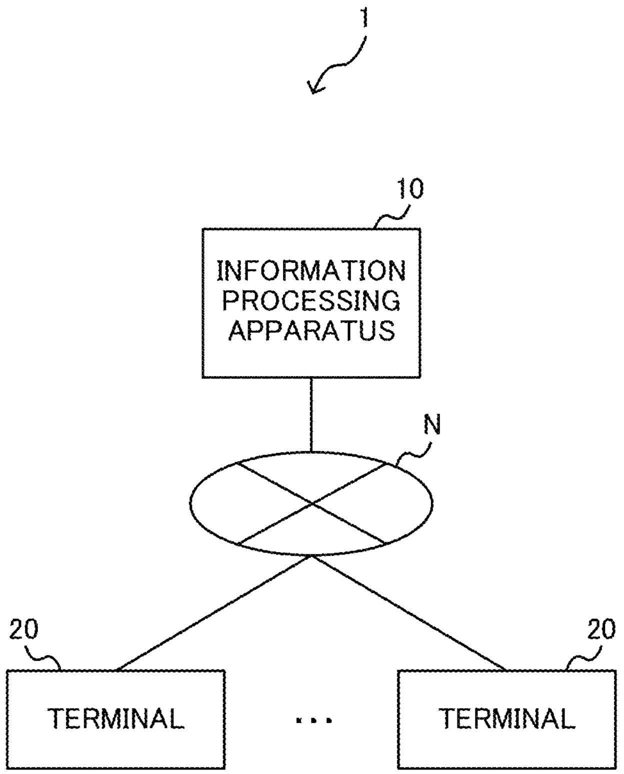
FIG. 1 shows an example of a system configuration of a betting system according to the present embodiment.

FIG. 1 shows an example of a system configuration of a betting system 1 according to the present embodiment. A betting system 1 shown in FIG. 1 includes an information processing apparatus 10 and one or more terminals 20. The information processing apparatus 10 and the terminal 20 are connected to each other in a manner enabling communications via a communication network N such as the Internet, an intranet, a wireless LAN, or a mobile communication network.

The information processing apparatus 10 is an apparatus that accepts a bet for a competition in which a bet can be placed on a betting target. Specifically, the information processing apparatus 10 is an apparatus for supporting a bettor who uses the terminal 20 to bet, in a competition such as a bicycle race, a horse race, or a motorboat race, a predetermined value on a contestant (including an animal or player) who is expected to win the competition.

The bettor may place a bet by determining a betting target defined by a combination of (i) a betting type (i.e., wager type) and (ii) a plurality of contestants or starting gate numbers corresponding to the plurality of contestants expected to win a competition, and by setting (i) the determined betting target and (ii) a predetermined value of the number of bets or a wager amount for the betting target to the terminal 20. In a case where a bicycle race is the competition to be the object of betting, the betting target is "a perfecta, in which the contestant number 5 comes in first and the contestant number 2 comes in second," or "a trio, in which the contestant number 1, the contestant number 2, and the contestant number 5 are chosen," for example. Note that the perfecta is to predict two contestants who come in the first and second places in exact order, and the trio is to predict three contestants who come in the first, second and third places in any order.

The predetermined value may be (i) money or (ii) points or the like which are usable in predetermined services or games. Also, the points may be points that can be received by the bettor for free (free points), or points that can be received in exchange for payment of money (chargeable points).

The information processing apparatus 10 includes one or a plurality of physical servers. The information processing apparatus 10 may be configured using a virtual server operating on a hypervisor or may be configured using a cloud server, for example.

The terminal 20 is a terminal used by a bettor who places a bet, and is an information processing terminal such as a cell phone (including a smartphone), a tablet terminal, or a personal computer, for example. The bettor can bet on the betting target by operating the terminal 20. Upon accepting an input of the betting target from the bettor, the terminal 20 transmits information indicating the betting target to the information processing apparatus 10 in association with bettor identification information (hereinafter referred to as a "bettor ID") for identifying the bettor who uses the terminal 20.

The information processing apparatus 10 executes a process of storing the betting target bet on by the bettor who uses the terminal 20, a process of storing the magnitude of a value owned by the bettor, a process of determining a reward amount (i.e., a payout) according to a result of a competition, and the like.

In the betting system 1, in order to make it easier for the bettor, who is a beginner bettor serving as a first player, to understand how he/she should place a bet, the information processing apparatus 10 presents a betting target to the bettor by displaying a betting target designated by a tipster, who is someone that predicts a result of a competition and serves as a second player, on the terminal 20. The tipster is a sharp bettor who has significant experience in betting in the competitions or a bettor who has abundant knowledge of the contestants, for example, and is registered in the information processing apparatus 10 in advance. The tipster may be some bettors among a plurality of bettors, or may be a person who only makes predictions without placing any bet.

The bettor can watch one or more betting targets displayed on the terminal 20 and then bet on the same betting target as the displayed betting target, or at least partially on the same betting target. In this description, an act of betting on exactly the same or at least partially the same betting target predicted by the tipster is referred to as "bandwagon betting".

The information processing apparatus 10 is characterized in that, if a bet of a beginner bettor who placed a bandwagon bet based on a predetermined tipster in a competition is a win, the information processing apparatus 10 executes a bet on the basis of a betting target designated by the same tipster in a competition that takes place after that competition, in order to make it easier for the beginner bettor to continuously place bets on the betting contents of another person whose win rate is high. Next, configurations and operations of the information processing apparatus 10 and the terminal 20 will be described in detail.

<Hardware Configuration>

Figure 2:
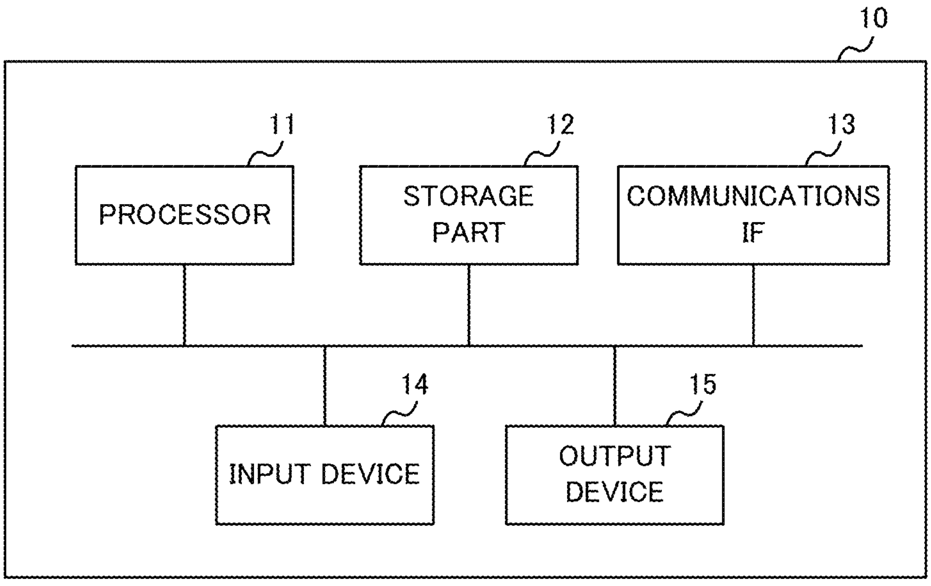
FIG. 2 shows an example of a hardware configuration of an information processing apparatus.

FIG. 2 shows an example of a hardware configuration of the information processing apparatus 10. The information processing apparatus 10 includes a processor 11, a storage part 12, a communication interface (IF) 13, an input device 14, and an output device 15.

The processor 11 is a central processing unit (CPU) or a graphical processing unit (GPU), and realizes various functions by executing a program stored in the storage part 12, for example.

The storage part 12 includes a storage medium such as a memory, a hard disk drive (HDD), or a solid state drive (SSD). The storage part 12 stores the program executed by the processor 11. The storage part 12 stores, in association with the bettor ID, the betting target, a bet amount (i.e., a wager amount), and the like that are selected by the bettor.

The communications IF 13 includes a communication controller that communicates with the terminal 20 wirelessly or by wire, via the network N. The communications IF 13 provides notification of data received from the terminal 20 to the processor 11. The communications IF 13 transmits the data input from the processor 11 to the terminal 20.

The input device 14 accepts an input operation from an administrator of the information processing apparatus 10, for example. The input device 14 is a keyboard, a touch panel, a mouse, or a microphone, for example. The output device 15 outputs information to the administrator of the information processing apparatus 10, for example. The output device 15 is a display, a speaker, or the like, for example.

Figure 3:
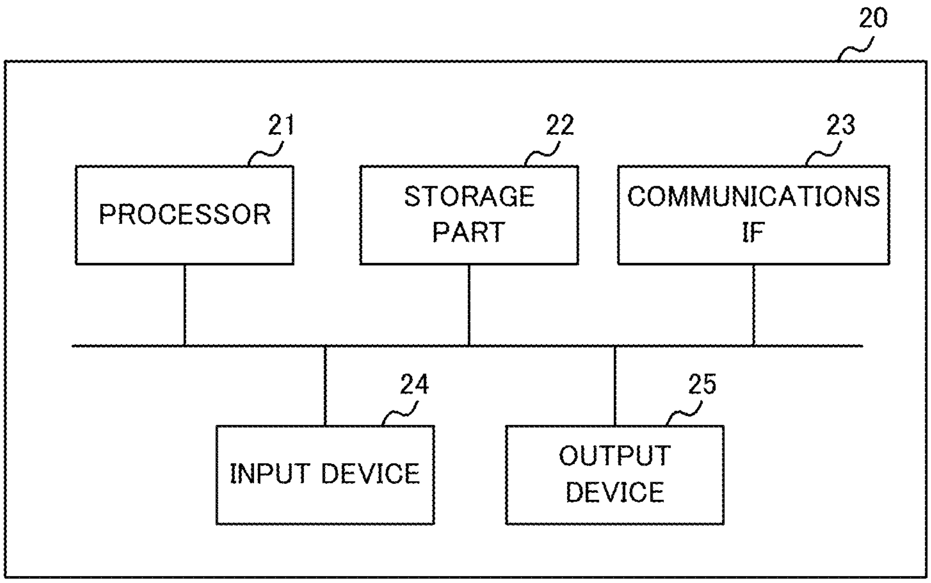
FIG. 3 shows an example of a hardware configuration of a terminal.

FIG. 3 shows an example of the hardware configuration of the terminal 20. The terminal 20 includes a processor 21, a storage part 22, a communications IF 23, an input device 24, and an output device 25.

The processor 21 is a CPU, for example, and realizes various functions by executing a program stored in the storage part 22.

The storage part 22 includes a storage medium such as a read only memory (ROM), a random access memory (RAM), or the like. The storage part 22 stores the program executed by the processor 21.

The communications IF 23 includes a communication controller that communicates with the information processing apparatus 10 wirelessly or by wire via the network N. The communications IF 23 provides notification of data received from the information processing apparatus 10 to the processor 21. The communications IF 23 transmits the data input from the processor 21 to the information processing apparatus 10.

The input device 24 accepts an input operation from the bettor, for example. The input device 24 is a keyboard, a touch panel, a mouse, or a microphone for example. The output device 25 outputs information to the bettor, for example. The output device 25 is a display or a speaker, for example.

<Functional Block Configuration>

Figure 4:
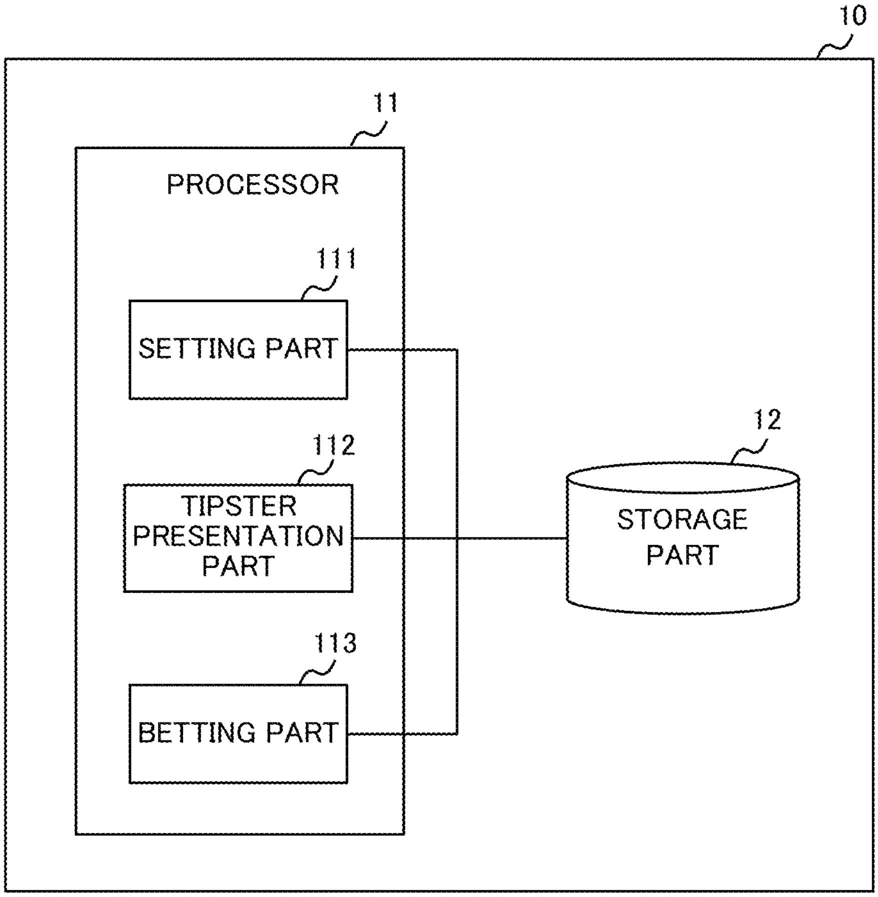
FIG. 4 shows a functional block configuration example of a processor.

FIG. 4 shows a functional block configuration example of the processor 11. The processor 11 includes a setting part 111, a tipster presentation part 112, and a betting part 113. The processor 11 functions as the setting part 111, the tipster presentation part 112, and the betting part 113 by executing the program stored in the storage part 12.

The setting part 111 sets an amount that is to be set as a wager amount of the bettor's bet for a second competition after a first competition in which a bandwagon bet was placed, out of a payout which is a value to be paid to the bettor when the bet corresponding to the bettor's bandwagon bet for the first competition is a win. The second competition is a competition that takes place immediately after the first competition, for example, but it is not limited to this. For example, any competition that takes place after the first competition on the same day of the first competition may be the second competition. In this case, any competition that the bettor wishes to place a bet on may be the second competition among the competitions that take place after the first competition.

For example, the setting part 111 accepts a setting of the maximum amount to be put in as a wager amount for the second competition out of the payout corresponding to the first competition from the bettor. Further, the setting part 111 may accept a setting of the percentage of the payout corresponding to the first competition to be put in as the wager amount for the second competition from the bettor. In addition, the setting part 111 may set in advance the maximum amount or the percentage of the payout to be put in as the wager amount for the second competition, and change the setting upon accepting the setting from the bettor. By doing this, the bettor can set (i) the wager amount to be put in for the second competition or (ii) an amount of the payout to be kept in reserve without being put into the second competition, to an amount he/she desires.

The tipster presentation part 112 presents a plurality of tipsters who predict outcomes of competitions to a bettor who places a bet on a competition. The tipster presentation part 112 presents a plurality of tipsters by transmitting a plurality of tipster names to the terminal 20 which the bettor uses and by displaying the plurality of tipster names on the terminal 20, for example.

Figure 5:
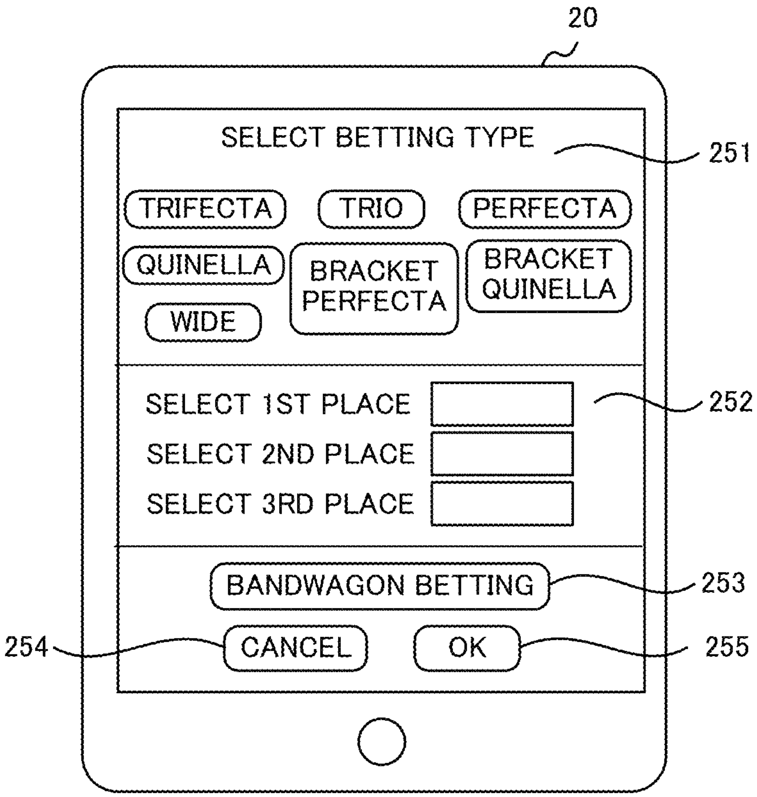
FIG. 5 is a screen to be displayed on a terminal on which application software for betting is launched.
Figure 6A:
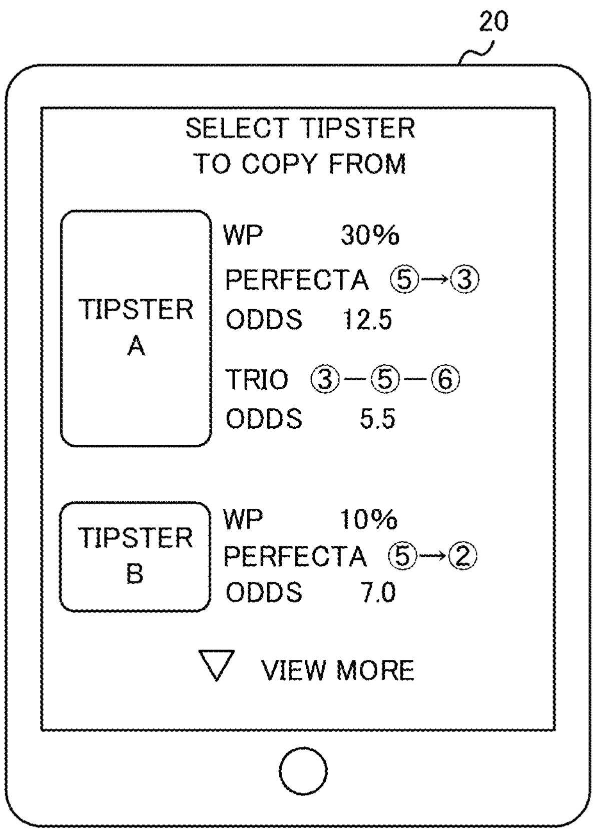
FIGS. 6A and 6B are each an example of a screen to be displayed on the terminal when a bettor selects to place a bandwagon bet.
Figure 6B:
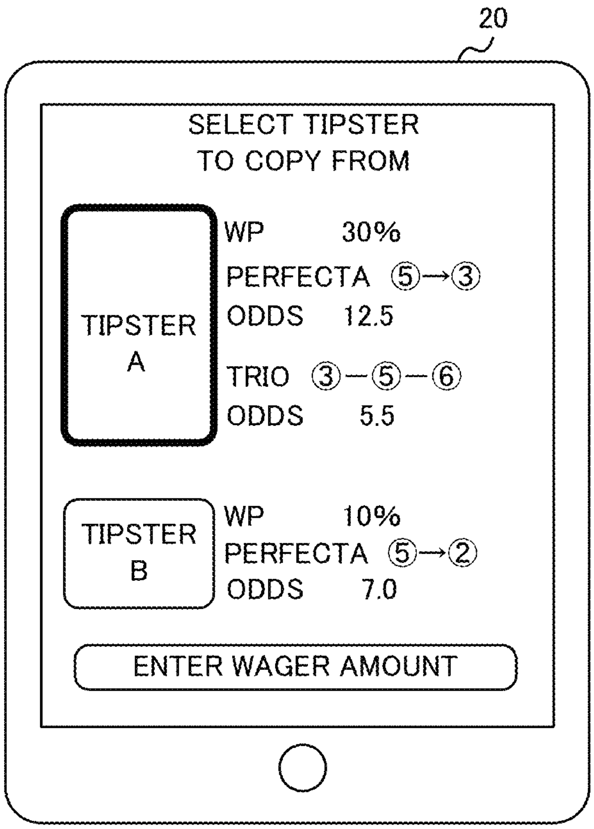
Figure 7A:
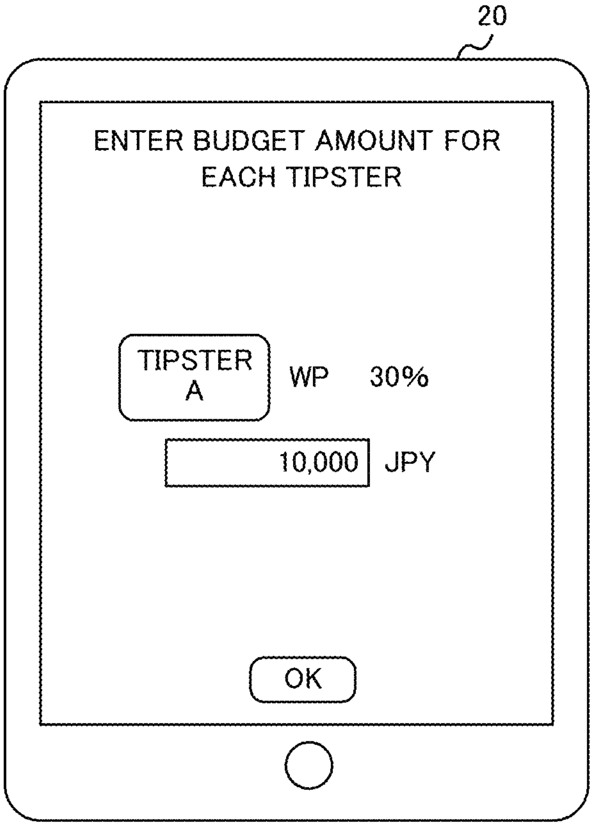
FIGS. 7A and 7B are each a screen for entering a budget amount of bandwagon betting.
Figure 7B:
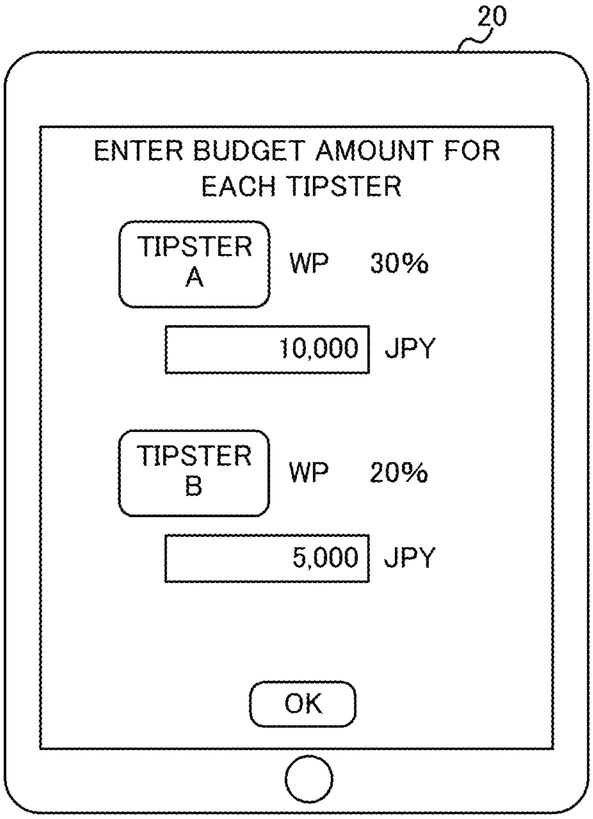
Figures 8, 9:
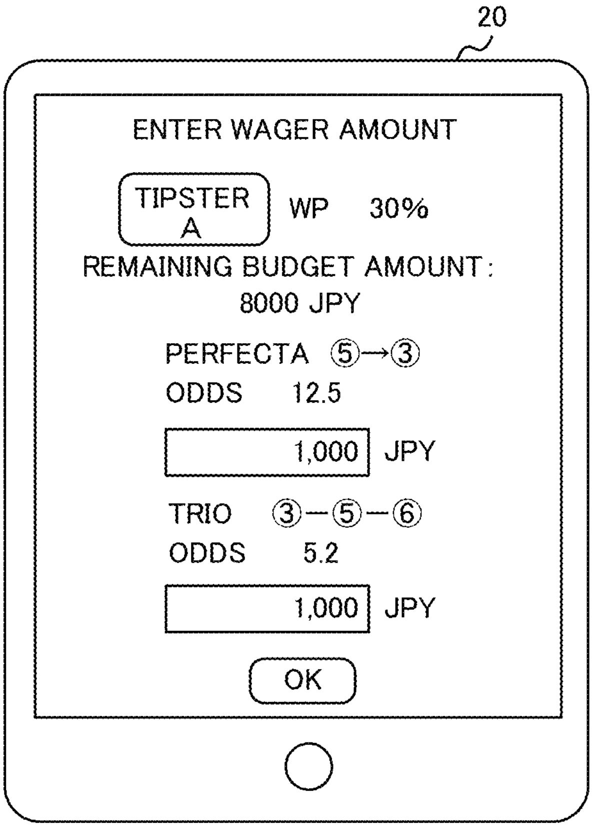
FIG. 8 is a screen for entering a wager amount of the bandwagon betting. This is an example of a screen to be displayed on the terminal when the bettor selects to place the bandwagon bet.
FIG. 9 shows an example of budget amount information.

FIGS. 5 to 8 each show an example of a screen to be displayed on the terminal 20 by the tipster presentation part 112. FIG. 5 is a screen to be displayed on the terminal 20 when application software for placing a bet is launched. FIGS. 6A and 6B are each an example of a screen to be displayed on the terminal 20 when the bettor selects to place a bandwagon bet. FIGS. 7A and 7B are each a screen for entering a budget amount of bandwagon betting. FIG. 8 is a screen for entering a wager amount of the bandwagon betting. The screens of FIGS. 7A, 7B, and 8 are displayed on the terminal 20 when the bettor selects a tipster for the bettor to place his/her bandwagon bet.

The screen shown in FIG. 5 shows an area 251 for selecting a betting type, an area 252 for entering a predicted betting target, an operation image 253 for selecting bandwagon betting, an operation image 254 for a cancelation operation, and an operation image 255 for a confirmation operation. When the bettor wishes to decide on a betting target by himself/herself, the bettor may place a bet by selecting a betting type in the area 251, entering the contestant number or the starting gate number in the area 252, and selecting an "OK" button of the operation image 255.

The bettor who wishes to place a bandwagon bet can place the bandwagon bet by selecting a "bandwagon betting" button of the operation image 253 and then selecting the "OK" button of the operation image 255, without operating the areas 251 and 252. When the "bandwagon bet" button is selected, the tipster presentation part 112 displays, on the terminal 20, a plurality of tipsters for the bettor to place his/her bandwagon bet, as shown in FIG. 6A.

In FIG. 6A, one or more predicted betting targets and odds corresponding to the predicted betting targets are displayed in association with a tipster name. The bettor selects a tipster to place his/her bandwagon bet for on the screen shown in FIG. 6A displayed on the terminal 20. When the bettor selects one or more tipsters on the screen shown in FIG. 6A, the screen transitions to a screen shown in FIG. 6B. When the bettor touches the "Enter wager amount" button on the screen shown in FIG. 6B, the screen transitions to a screen shown in FIG. 7.

On the screen shown in FIG. 7, the bettor enters a budget amount to be allocated to the selected tipster. When a single tipster is selected in FIG. 6B, a screen for entering the budget amount to that tipster is displayed, as shown in FIG. 7A. When a plurality of tipsters are selected in FIG. 6B, a screen for entering the budget amount for the respective tipsters is displayed, as shown in FIG. 7B. When the bettor enters the budget amount for the tipster and then touches the "OK" button in FIG. 7A or 7B, the terminal 20 displays a screen shown in FIG. 8.

A wager-amount entry field for each of one or more betting targets that are designated by the tipster selected by the bettor and a remaining budget amount are displayed on the screen shown in FIG. 8. The remaining budget amount is calculated by subtracting the wager amount entered in the wager-amount entry field from the budget amount entered by the bettor in FIG. 7, and displayed.

On the screen shown in FIG. 8, the bettor enters the wager amount for at least any one of the one or more betting targets designated by the selected tipster. The terminal 20 accepts an entry of the wager amount within a range of the budget amount allotted by the bettor. In a case where the number of tipsters selected by the bettor is one, when the bettor enters the wager amount within the range of the budget amount and then touches the "OK" button, the terminal 20 transmits (i) the bettor ID, (ii) selection information indicating the selected tipster selected by the bettor from among the plurality of tipsters, (iii) a remaining budget amount for the selected tipster, (iv) a betting instruction for a betting target that is at least partially the same as the betting target designated by the selected tipster (that is, a bandwagon-betting instruction for placing a bandwagon bet based on the selected tipster), and (v) the wager amount to the information processing apparatus 10.

When there are a plurality of tipsters selected by the bettor, the screen shown in FIG. 8 is displayed corresponding to each of the tipsters. For example, the terminal 20 displays the screen shown in FIG. 8 and corresponding to a tipster A, and accepts an entry of a wager amount from the bettor within a range of a budget amount allotted to the tipster A. When the bettor enters the wager amount and then touches the "OK" button, the terminal 20 displays the screen as shown in FIG. 8 and corresponding to a tipster B. The terminal 20 accepts an entry of a wager amount within a range of a budget amount allotted to the tipster B. When the bettor enters the wager amount and then touches the "OK" button, the terminal 20 transmits (i) the bettor ID, (ii) selection information indicating each of the plurality of selected tipsters selected by the bettor from among the plurality of tipsters, (iii) a remaining budget amount for the selected tipsters, (iv) the bandwagon-betting instruction for placing the bandwagon bet based on the selected tipsters, and (v) the wager amount to the information processing apparatus 10.

The betting part 113 accepts a betting instruction of the bettor for a competition by receiving, from the terminal 20 of the bettor, (i) the bettor ID, (ii) a betting instruction for placing a bet on the betting target in the competition, and (iii) the wager amount. The betting part 113 executes a bet of the bettor for the competition according to the betting instruction.

The betting part 113 accepts the bandwagon-betting instruction for the competition from the bettor by receiving, from the terminal 20 of the bettor, (i) the bettor ID, (ii) selection information indicating one or more selected tipsters selected by the bettor from among the plurality of tipsters, (iii) the remaining budget amount for the selected tipsters, (iv) the bandwagon-betting instruction, and (v) the wager amount.

Upon receiving the bandwagon-betting instruction, the betting part 113 associates the bettor ID of the bettor, the tipster name of the selected tipster, and the remaining budget amount with each other, and stores them in the storage part 12 as budget amount information. FIG. 9 shows an example of the budget amount information. As shown in FIG. 9, it can be confirmed that the bettor ID, the tipster name, and the remaining budget amount are associated with each other in the budget amount information.

When the bettor selects a single tipster, the betting part 113 executes, according to the bettor's bandwagon-betting instruction, the bet of the bettor for the first competition on the basis of the betting target designated by the tipster for the first competition.

When the bettor selects a plurality of tipsters (for example, a second player and a third player), the betting part 113 executes the bet of the bettor for the first competition on the basis of the betting target designated by each of the plurality of tipsters for the first competition according to the bettor's bandwagon-betting instruction. For example, when the bettor selects the tipster A as the second player and the tipster B as the third player, the betting part 113 bets at least a part of a budget amount set for the tipster A as the wager amount of the bettor's bet for the first competition based on the betting target designated by the tipster A. Further, the betting part 113 bets at least a part of a budget amount set for the tipster B as the wager amount of the bettor's bet for the first competition based on the betting target designated by the tipster B.

If the bettor's bet for the first competition is a win, the betting part 113 executes a bet of the bettor for the second competition on the basis of the betting target designated by the tipster for the second competition that takes place after the first competition. If the bettor's bet for the first competition is a win, the betting part 113 controls the tipster presentation part 112 to display, on the terminal 20, a screen for entering a wager amount of a bandwagon bet based on the same tipster as the tipster selected by the bettor in the first competition, and executes the bettor's bandwagon bet based on that tipster for the second competition.

In this case, if the bettor's bet for the first competition is a win, the betting part 113 may set at least a part of the payout, which is a value paid to the bettor, as the wager amount of the bettor's bet for the second competition. Further, if the bettor's bet for the first competition is not a win, the betting part 113 may perform control not to execute the bet of the bettor for the second competition on the basis of the betting target designated for the second competition by the tipster who is designated by the bettor in the first competition. By doing this, the bettor can increase his/her win rate because he/she can narrow down the tipsters with high win rates and place a bet following the betting contents of such tipsters. In addition, the bettor can not only keep down a new expense for the second competition, but can also increase the possibility of increasing a value to be paid to the bettor when the bettor's bet is a win in the second competition by betting the value paid to the bettor as a wager amount of the bet of the second competition.

The betting part 113 executes the bet of the bettor for the second competition as described below. First, the betting part 113 determines whether or not the bettor's bet for the first competition was a win. For example, when at least any one of one or more bandwagon bets that the bettor placed based on the tipster is a win, the betting part 113 determines that the bet is a win.

When it is determined that the bettor's bet for the first competition is a win, the betting part 113 updates the budget amount information stored in the storage part 12 on the basis of the payout to be paid to the bettor. For example, the betting part 113 adds the payout to the remaining budget amount of the budget amount information stored in the storage part 12 on the basis of the setting accepted by the setting part 111. For example, when the maximum amount of the payout to be put in as the wager amount of the second competition is set by the setting part 111, the betting part 113 adds the maximum amount of the payout to the remaining budget amount. Also, when the percentage of the payout to be put in as the wager amount of the second competition is set by the setting part 111, the betting part 133 adds an amount based on the percentage of the payout to the remaining budget amount.

The betting part 113 determines that the bet is a win when at least any one of the one or more bandwagon-bets is a win, but the present disclosure is not limited thereto. When the bettor places bandwagon bets on a plurality of betting targets designated by a single tipster, the betting part 113 may determine that the bet is a win on the condition that a predetermined percentage or more of betting targets are wins. In addition, when the bettor places the bandwagon bets on the plurality of betting targets designated by a single tipster, the betting part 113 may determine that the bet is a win on the condition that the payout is larger than the total sum of the wager amounts.

Figure 10:
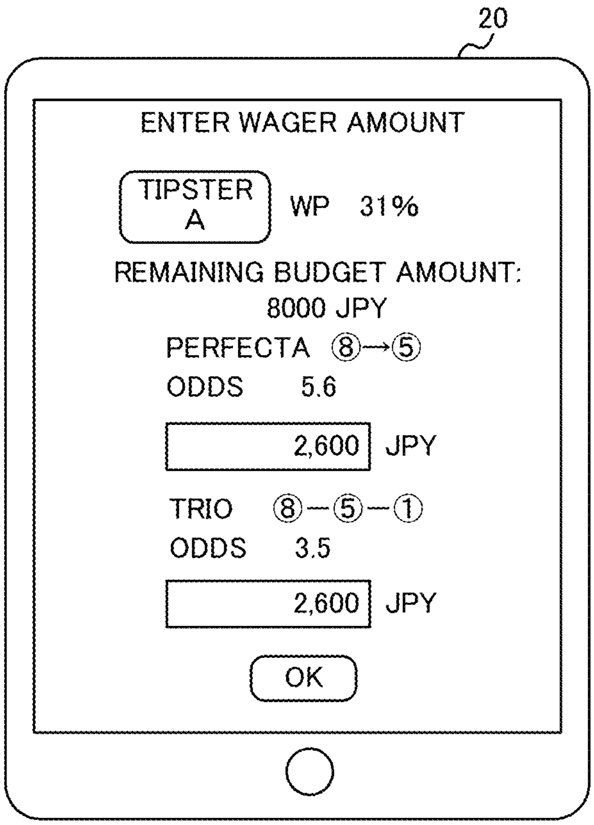
FIG. 10 is a screen for entering a wager amount of the bandwagon betting for a second competition.

When accepting a bet for the second competition when the bet of the bandwagon betting of the bettor for the first competition is a win, the tipster presentation part 112 causes the terminal 20, which is used by the bettor, to directly display a screen for entering a wager amount of the bandwagon bet based on the tipster selected by the bettor in the first competition, without displaying the screens shown in FIGS. 5, 6A and 6B. FIG. 10 is a screen for entering the wager amount of the bandwagon betting for the second competition. A screen configuration shown in FIG. 10 is the same as the screen configuration shown in FIG. 8.

For example, suppose that a bet in which a bet type is a "trio" and the combination of contestants "3-5-6" is a win from among the betting targets shown on the screen shown in FIG. 8, and 5,200 yen is paid to the bettor as the payout. When 5,200 yen is lower than the maximum amount of the payout to be put in as the wager amount of the second competition set by the setting part 111, the betting part 113 bets 5,200 yen paid to the bettor as the wager amount of the bettor's bet for the second competition. In the example shown in FIG. 10, 5,200 yen is automatically entered evenly to two betting targets designated by the tipster as the wager amount. On the screen shown in FIG. 10, the remaining budget amount indicated by the budget amount information stored in the storage part 12 is displayed.

In addition, when the bettor places bandwagon bets based on a plurality of tipsters, the betting part 113 may execute the bet of the bettor for the second competition on the basis of the betting target designated in the second competition by a tipster who is selected depending on which of the plurality of tipsters (the second player and the third player) was a winner (i.e. a tipster who won the bet) in the first competition. The betting part 113 executes the bet of the bettor for the second competition on the basis of a betting target designated by the tipster who won in the first competition, for example.

The betting part 113 may determine the wager amount of the bettor's bet for the second competition depending on which tipster among the plurality of tipsters (the second player and the third player) was a winner (i.e. a tipster who won the bet) in the first competition. For example, if the bettor's bet for the first competition based on the betting target designated by the first tipster (second player) is a win and the bettor's bet for the first competition based on the betting target designated by the second tipster (third player) is not a win, the betting part 113 bets the value to be paid to the bettor when the bettor's bet for the first competition is a win and at least a part of a budget amount set for the first tipster as the wager amount of the bettor's bet for the second competition based on the betting target designated by the first tipster.

For example, when the bettor places bandwagon bets based on both the tipster A and the tipster B, suppose that the bettor's bet for the first competition based on the betting target designated by the tipster A is a win, and the bettor's bet for the first competition based on the betting target designated by the tipster B is not a win.

In this case, the betting part 113 sets the remaining budget amount associated with the tipster B in the budget amount information stored in the storage part 12 to 0 yen, and controls the bet of the bettor for the second competition so that the bet for the second competition is not executed on the basis of the betting target designated for the second competition by the tipster B. In addition, the betting part 113 controls the tipster presentation part 112 to display a screen for entering the wager amounts of the bandwagon betting for the second competition shown in FIG. 10 on the terminal 20 used by the bettor. When displaying the screen shown in FIG. 10, the betting part 113 may set the upper limit amount of the wager amount on the basis of (i) the remaining budget amount indicated by the budget amount information stored in the storage part 12 and (ii) the payout of the bet of the bettor for the first competition based on the betting target designated by the tipster A.

The betting part 113 may further add at least a part of the budget amount set for the tipster B (second tipster) to the wager amount of the bettor's bet for the second competition based on the betting target designated by the tipster A (first tipster). For example, in the budget amount information stored in the storage part 12, the betting part 113 adds at least a part of the remaining budget amount associated with the tipster B to the remaining budget amount of the tipster A, and sets the remaining budget amount associated with the tipster B to 0 yen. Then, the betting part 113 sets the upper limit amount of the wager amount on the basis of (i) the updated remaining budget amount of the tipster A stored in the storage part 12 and (ii) the payout of the bet of the bettor for the first competition based on the betting target designated by the tipster A.

In this way, the information processing apparatus 10 can allot, in the second competition, a part of the budget amount set for the tipster who made an incorrect prediction to the bet based on the tipster who made a correct prediction. This enables the bettor to avoid continuous jumping on the bandwagon with a tipster having a low win rate, and to bet intensively on the betting targets designated by the tipster having a high win rate, and therefore the bettor can increase his/her win rate.

<Processing Flow of the Information Processing Apparatus 10>

Figure 11:
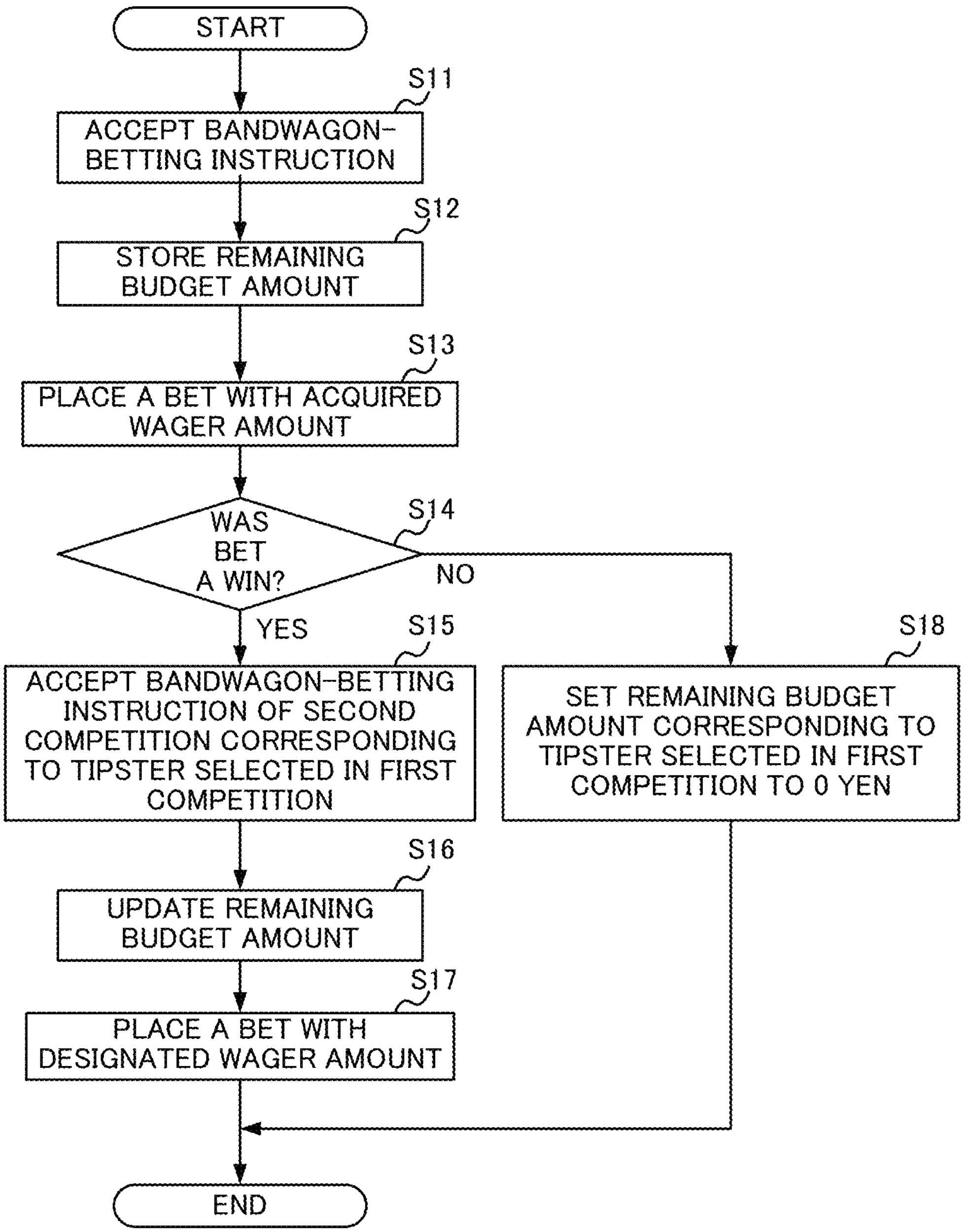
FIG. 11 is a flowchart showing processing of the information processing apparatus.

FIG. 11 is a flowchart showing processing of the information processing apparatus 10. The flowchart shown in FIG. 11 starts from the point in time when the "bandwagon betting" is selected on the screen shown in FIG. 5. In the description of this flowchart, for simplicity, an example in which the bettor selects one tipster will be described.

First, the betting part 113 accepts a bandwagon-betting instruction by acquiring (i) the tipster selected by the bettor in the first competition, (ii) the bandwagon-betting instruction, (iii) the wager amount, and (iv) the remaining budget amount from the terminal 20 (S11). Upon receiving the bandwagon-betting instruction, the betting part 113 associates the bettor ID of the bettor, the tipster name of the selected tipster, and the remaining budget amount with each other, and stores them in the storage part 12 as budget amount information (S12), and places a bet with the acquired wager amount (S13).

Next, the betting part 113 determines whether or not a bet for the first competition was a win (S14). When the betting part 113 determines that the bet for the first competition was a win, the betting part 113 shifts the process to S15. In S15, the betting part 113 controls the tipster presentation part 112 to cause the terminal 20 to display a screen for entering the wager amount of the bandwagon betting to the tipster selected in the first competition, and accepts a bandwagon-betting instruction for the second competition corresponding to the tipster selected in the first competition.

When the betting part 113 accepts the bandwagon-betting instruction, the betting part 113 updates the budget amount information stored in the storage part 12 (S16), and places a bet with the designated wager amount (S17).

If it is determined in S14 that the bet was not a win, the betting part 113 shifts the process to S18, sets the remaining budget amount corresponding to the tipster selected in the first competition to 0 yen in the budget amount information stored in the storage part 12, and controls the bet of the bettor for the second competition so that the bet for the second competition is not executed on the basis of the betting target designated for the second competition by the tipster who is designated by the bettor in the first competition.

Variation Example

In the above description, the tipster presentation part 112 displays, on the terminal 20, the screen for selecting the tipster shown in FIG. 6A in response to selecting of the "bandwagon betting" button on the screen shown in FIG. 5, and accepts the selection of the tipster for the bandwagon betting from the bettor, but the present disclosure is not limited to this. The tipster presentation part 112 may cause the terminal 20 to display a screen including a streaming video associated with the tipster, and may cause the terminal 20 to display the betting target designated by the tipster who is associated with the streaming video.

In this case, the tipster presentation part 112 causes the terminal 20 to display a screen for designating a video (a video designation screen) for accepting a designation of any one of one or more streaming videos which can be streamed to the terminal 20. Upon accepting the designation of a streaming video in the video designation screen, the tipster presentation part 112 transmits, to the terminal 20, a screen including the designated streaming video and the betting target designated by the tipster who is associated with that streaming video. The betting part 113 executes, according to the instruction of the bettor, the bet of the bettor for the first competition on the basis of the betting target designated by the tipster who is associated with the designated streaming video and displayed on the terminal 20.

Figure 12:
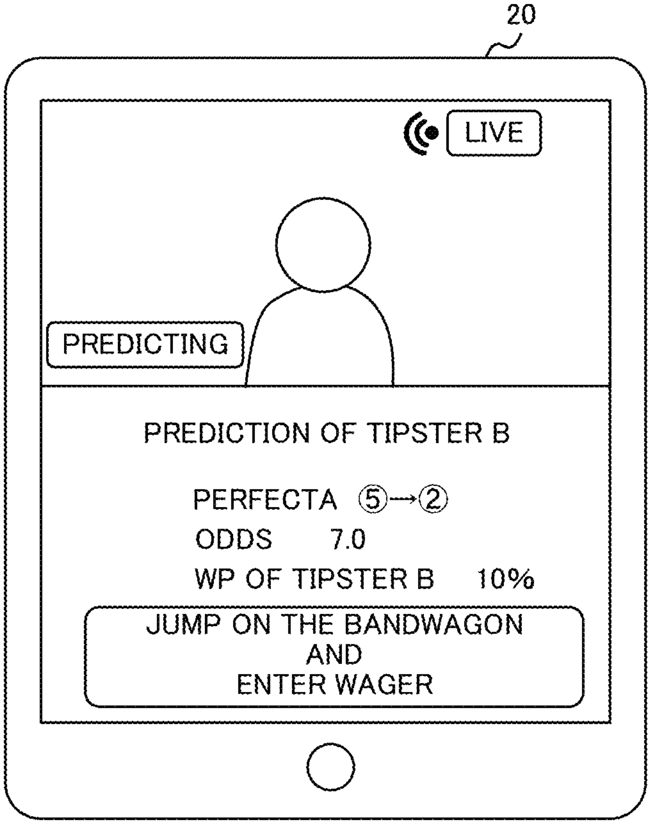
FIG. 12 is a screen including a streaming moving image.

FIG. 12 is the screen including the streaming video. As shown in FIG. 12, the screen including the streaming video displays (i) the streaming video, (ii) the predicted betting target predicted by the tipster who is associated with the streaming video, (iii) odds corresponding to the predicted betting target, and (iv) a winning percentage (WP) of the tipster. Also, on the screen including the streaming video, "Jump on the bandwagon and enter wager" is displayed, and the "bandwagon betting" button for accepting the bandwagon betting is displayed. When the bettor touches the "bandwagon betting" button shown in FIG. 9, the screen transitions to the screen shown in FIG. 7.

Thereafter, the terminal 20 displays the screen shown in FIG. 8, and accepts an entry of the wager amount from the bettor. The terminal 20 transmits, to the information processing apparatus 10, (i) the bettor ID, (ii) selection information indicating a tipster associated with the streaming video, (iii) a remaining budget amount for the tipster, (iv) a betting instruction for a betting target that is at least partially the same as the betting target designated by the tipster, and (v) the wager amount.

The betting part 113 executes the bet of the bettor for the first competition by receiving the bettor ID, a betting instruction for a betting target in the first competition, and the wager amount from the terminal 20 of the bettor. In this way, the bettor can place the bandwagon bet while confirming the comments and the betting target of the tipster who is associated with the streaming video and designated by the bettor himself/herself.

<Effect of the Betting System 1>

As described above, the betting part 113 executes, according to the instruction of the bettor, the bet of the bettor for the first competition on the basis of the betting target designated by the tipster for the first competition, and executes the bet of the bettor for the second competition on the basis of the betting target designated by the tipster for the second competition if the bettor's bet for the first competition is a win. Because the betting part 113 operates in the above-described manner, the bettor can increase his/her probability of winning bets in a plurality of competitions by placing his/her bets based on a tipster whose prediction for the first competition is a win and who is considered likely to predict correctly in the second competition as well. This may deter the beginner bettor from deciding not to place a bet due to his/her inability to win with his/her own betting contents. Also, the trouble of selecting a tipster having a high win rate is reduced because the bettor can continuously and easily bet on the basis of the betting targets designated by the tipster having a high win rate, without designating a new tipster.

Further, according to the betting system 1, a bettor who wishes to bet on a competition by using information provided by tipsters familiar with the bet can place a bet on the betting target designated by the tipster, without sending or receiving data to and from the tipster using communication means such as electronic mail or telephone. Because the betting system 1 operates in this manner, the terminal 20 used by the bettor can reduce the usage time of the communication means such as electronic mail or telephone, and therefore there is a technical effect that power consumption of the terminal 20 can be reduced. In addition, the betting system 1 can reduce the frequency of data exchange between the bettor and the tipster, and therefore there is a technical effect that the amount of data transmitted through a communication line is reduced.

The present disclosure is explained on the basis of the exemplary embodiments. The technical scope of the present disclosure is not limited to the scope explained in the above embodiments and it is possible to make various changes and modifications within the scope of the invention. For example, in the above-described embodiment, the betting system 1 accepts the budget amount entered from the bettor, but it may not accept the budget amount. In the above-described embodiments, if the bettor's bet for the second competition is a win, a bet of the bettor for a third competition may be executed on the basis of the betting target designated by the tipster for the third competition that takes place after the second competition. In this case, the present disclosure may be applied to a case where the second competition is regarded as the first competition and the third competition is regarded as the second competition, when the bet is completed in the second competition.

In the above-described embodiments, the information processing apparatus 10 accepts the bet in the competition in which contestants move in a competition field, but it is not limited to this. For example, the information processing apparatus 10 may accept a bet placed on (i) a player participating in e-sports such as a competitive game or (ii) a character operated by the player in a competitive game. In this case, when the player or character whom the bet is placed on by the bettor wins, it is assumed that the bet is a win.

Also, for example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

In addition to the above-described embodiments, the followings configurations are additionally described.

(Appendix 1)

An information processing apparatus which accepts a bet for each competition in which a bet can be placed on a betting target; the information processing apparatus includes a betting part that executes, according to an instruction of a first player, a first player's bet for a first competition on the basis of a betting target designated by a second player for the first competition; wherein the betting part executes a first player's bet for a second competition that takes place after the first competition, on the basis of a betting target designated by the second player for the second competition if the first player's bet for the first competition is a win. Since the information processing apparatus is configured in this manner, the first player places a bet on the basis of the betting target designated by the second player, and if said bet is a win, the first player will place a bet on the basis of the betting target designated by the second player in a subsequent competition. This makes it easier for a beginner bettor (first player) to continuously place bets on the betting contents of another person (second player) with a high win rate.

(Appendix 2)

The information processing apparatus according to Appendix 1, wherein the betting part does not execute the first player's bet for the second competition on the basis of the betting target designated by the second player for the second competition if the first player's bet for the first competition is not a win. Since the information processing apparatus is configured in this manner, the first player can avoid placing a bet following a tipster whose prediction was incorrect. As a result, the first player can narrow down the tipsters with high win rates and place a bet following the betting contents of such tipsters. Therefore, the first player can increase his/her win rate.

(Appendix 3)

The information processing apparatus according to Appendix 1 or 2, wherein the betting part bets at least a part of a value to be paid to the first player as a wager amount of the first player's bet for the second competition when the first player's bet for the first competition is a win. Since the information processing apparatus is configured in this manner, the first player can keep down a new expense for the second competition. Further, by betting a value to be paid to the first player as a wager amount, the first player can increase the possibility of increasing a value to be paid to the first player if the first player wins the bet in the second competition.

(Appendix 4)

The information processing apparatus according to Appendix 3, further including a setting part that sets an amount that is to be set as the wager amount of the first player's bet for the second competition, from out of the value. Since the information processing apparatus is configured in this manner, the first player can set (i) the wager amount to be put in for the second competition or (ii) an amount of the payout to be kept in reserve without being put in the second competition, to an amount he/she desires.

(Appendix 5)

The information processing apparatus according to any one of Appendixes 1 to 4, wherein the betting part executes, according to an instruction of the first player, the first player's bet for the first competition further on the basis of a betting target designated by a third player for the first competition, and executes the first player's bet for the second competition on the basis of a betting target designated in the second competition by a player who is selected depending on which of the second player and the third player wins the bet in the first competition. Since the information processing apparatus is configured in this manner, the first player can increase his/her win rate in the second competition when he/she has placed a bet in the first competition on the basis of betting contents of the plurality of other players.

(Appendix 6)

The information processing apparatus according to any one of Appendixes 1 to 4, wherein the betting part executes, according to an instruction of the first player, the first player's bet for the first competition further on the basis of a betting target designated by a third player for the first competition, the betting part bets at least a part of a budget amount set for the second player as a wager amount of the first player's bet for the first competition based on the betting target designated by the second player, and the betting part bets at least a part of a budget amount set for the third player as a wager amount of the first player's bet for the first competition based on the betting target designated by the third player. Since the information processing apparatus is configured in this manner, the first player can bet following the second player having a high win rate, and increase the possibility that the first player's own prediction is correct.

(Appendix 7)

The information processing apparatus according to Appendix 6, wherein the betting part bets (i) a value to be paid to the first player when the first player's bet for the first competition is a win and (ii) at least a part of the budget amount set for the second player as a wager amount of the first plyer's bet for the second competition based on a betting target designated by the second player if the first player's bet for the first competition based on a betting target designated by the second player is a win and the first player's bet for the first competition based on the betting target designated by the third player is not a win. Since the information processing apparatus is configured in this manner, the first player can easily adjust the wager amount in the second competition. In addition, the first player can bet intensively on the betting targets designated by a tipster having a high win rate.

(Appendix 8)

The information processing apparatus according to Appendix 7, wherein the betting part further adds at least a part of the budget amount set for the third player to the wager amount of the first player's for the second competition based on the betting target designated by the second player. Since the information processing apparatus is configured in this manner, the first player can allot, in the betting of the second competition, a part of the budget amount set for a person who predicted incorrectly to the bet based on a person who predicted correctly.

(Appendix 9)

The information processing apparatus according to any one of Appendixes 1 to 8, further including a presentation part that accepts a designation of any one of one or more streaming videos that can be streamed to a terminal used by the first player, and causes to be displayed, on the terminal, the designated streaming video and the betting target designated by the second player who is associated with the designated streaming video, wherein the betting part executes, according to an instruction of the first player, the first player's bet for the first competition on the basis of the betting target designated by the second player associated with the designated streaming video and displayed on the terminal. Since the information processing apparatus is configured in this manner, the first player can place a bandwagon bet while confirming the comments and the betting target of the second player who is associated with the streaming video designated by the first player himself/herself.

(Appendix 10)

An information processing method that is executed by a computer which accepts a bet for each competition in which a bet can be placed on a betting target, includes the steps of executing, according to an instruction of a first player, a first player's bet for a first competition on the basis of a betting target designated by a second player for the first competition; executing a first player's bet for a second competition that takes place after the first competition, on the basis of a betting target designated by the second player for the second competition if the first player's bet for the first competition is a win. By executing such an information processing method, the first player places a bet on the basis of the betting target designated by the second player, and if said bet is a win, the first player will place a bet on the basis of the betting target designated by the second player in a subsequent competition. This makes it easier for a beginner bettor (first player) to continuously place bets on the betting contents of another person (second player) having a high win rate.

(Appendix 11)

A program that cause a compute which accepts a bet for each competition in which a bet can be placed on a betting target, to function as a betting part that executes, according to an instruction of a first player, a first player's bet for a first competition on the basis of a betting target designated by a second player for the first competition, wherein the betting part executes a first player's bet for the second competition that takes place after the first competition, on the basis of a betting target designated by the second player for the second competition if the first player's bet for the first competition is a win. By executing such a program with the processor, the first player places a bet on the basis of the betting target designated by the second player, and if said bet is a win, the first player will place a bet on the basis of the betting target designated by the second player in a subsequent competition. This makes it easier for a beginner bettor (first player) to continuously place bets on the betting contents of another person (second player) having a high win rate.

What is claimed is:

1. An information processing apparatus for accepting a bet for each competition in which the bet is placed on a betting target, the information processing apparatus comprising:

a memory; and a processor configured to execute a process including executing, according to an instruction of a first player, a first player's bet placed on a first betting target for a first competition based on a first betting target designated by a second player for the first competition, in response to the first player's bet for the first competition being a win, executing the first player's bet placed on a second betting target for a second competition that takes place after the first competition, based on a second betting target designated by the second player for the second competition, by storing (i) the second betting target for the second competition in association with an identification of the first player and (ii) the second betting target designated by the second player for the second competition in the memory, and in response to the first player's bet for the first competition being not a win, not executing the first player's bet for the second competition based on the second betting target designated by the second player for the second competition.

2. The information processing apparatus according to claim 1, wherein the process further includes in response to the first player's bet for the first competition being a win, betting at least a part of a value to be paid to the first player as a wager amount of the first player's bet for the second competition.

3. The information processing apparatus according to claim 2, wherein the process further includes setting an amount that is to be set as the wager amount of the first player's bet for the second competition, from out of the value.

4. The information processing apparatus according to claim 1, wherein the process further includes executing, according to another instruction of the first player, the first player's bet for the first competition further based on a first betting target designated by a third player for the first competition, and executing the first player's bet for the second competition based on a second betting target designated in the second competition by a player who is selected depending on which of the second player and the third player wins the bet in the first competition.

5. The information processing apparatus according to claim 1, wherein the process further includes executing, according to another instruction of the first player, the first player's bet for the first competition further based on a first betting target designated by a third player for the first competition, betting at least a part of a budget amount set for the second player as a wager amount of the first player's bet for the first competition based on the first betting target designated by the second player, and betting at least a part of a budget amount set for the third player as a wager amount of the first player's bet for the first competition based on the first betting target designated by the third player.

6. The information processing apparatus according to claim 5, wherein the process further includes, in response to (a) the first player's bet for the first competition based on the first betting target designated by the second player being a win, and (b) the first player's bet for the first competition based on the first betting target designated by the third player being not a win, betting (i) a value to be paid to the first player in response to the first player's bet for the first competition being a win and (ii) at least a part of the budget amount set for the second player, as a wager amount of the first player's bet for the second competition based on the second betting target designated by the second player.

7. The information processing apparatus according to claim 6, wherein the process further includes adding at least a part of the budget amount set for the third player to the wager amount of the first player's bet for the second competition based on the second betting target designated by the second player.

8. The information processing apparatus according to claim 1, wherein the process further includes accepting a designation of any one of one or more streaming videos to be streamed to a terminal used by the first player, causing the terminal to display the designated streaming video of the one or more streaming videos and the first betting target designated by the second player who is associated with the designated streaming video, and executing, according to another instruction of the first player, the first player's bet for the first competition based on the first betting target designated by the second player associated with the designated streaming video and displayed on the terminal.

9. The information processing apparatus according to claim 1, wherein the memory stores a betting target of when the processor executed the first player's bet, and the process further includes executing, according to another instruction of the first player received via a network from a terminal which the first player uses, the first player's bet for the first competition based on the first betting target designated by the second player, in response to the first player's bet for the first competition being a win, executing the first player's bet for the second competition based on the second betting target designated by the second player for the second competition, by causing the terminal to display a screen for entering a wager amount for the second betting target designated by the second player for the second competition, and in response to the first player's bet for the first competition being not a win, not executing the first player's bet for the second competition based on the second betting target designated by the second player for the second competition by not causing the terminal to display a screen for entering a wager amount of a bandwagon bet based on the second player.

10. The information processing apparatus according to claim 1, wherein the memory stores in association with the first player and the second player, a budget amount used for a bet based on a further betting target designated by the second player, and the process further includes executing the first player's bet using at least a part of the budget amount associated with the second player as a wager amount of when the first player bets on the further betting target designated by the second player.

11. The information processing apparatus according to claim 10, wherein the executing includes, in response to the first player's bet for the first competition being a win, updating the budget amount stored, in association with the first player and the second player, in the memory by adding payout to be paid to the first player.

12. The information processing apparatus according to claim 11, wherein the executing includes updating the budget amount stored in the memory by adding an amount based on a percentage, which is set in advance, of at least a part of the budget amount associated with the second player.

13. An information processing method that is executed by a computer which accepts a bet for each competition in which the bet is placed on a betting target, comprising:

executing, by the computer, according to an instruction of a first player, a first player's bet placed on a first betting target for a first competition based on a first betting target designated by a second player for the first competition;

in response to the first player's bet for the first competition being a win, executing, by the computer, the first player's bet placed on a second betting target for a second competition that takes place after the first competition, based on a second betting target designated by the second player for the second competition, by storing (i) the second betting target for the second competition in association with an identification of the first player and (ii) the second betting target designated by the second player for the second competition in the computer; and in response to the first player's bet for the first competition being not a win, not executing, by the computer, the first player's bet for the second competition based on the second betting target designated by the second player for the second competition.

14. An information processing system, comprising:

an information processing apparatus configured to accept a bet for each competition in which the bet is placed on a betting target; and a terminal for placing the bet on the betting target, wherein the information processing apparatus has a memory; and a processor configured to execute a process including executing, according to an instruction of a first player received from the terminal, a first player's bet placed on a first betting target for a first competition based on a first betting target designated by a second player for the first competition, in response to the first player's bet for the first competition being a win, executing the first player's bet placed on a second betting target for a second competition that takes place after the first competition, based on a second betting target designated by the second player for the second competition, by storing (i) the second betting target for the second competition in association with an identification of the first player and (ii) the second betting target designated by the second player for the second competition in the memory, and in response to the first player's bet for the first competition being not a win, not executing the first player's bet for the second competition based on the second betting target designated by the second player for the second competition.

* * * * *